(12) United States Patent
Kean

(10) Patent No.: US 7,203,842 B2
(45) Date of Patent: Apr. 10, 2007

(54) METHOD AND APPARATUS FOR SECURE CONFIGURATION OF A FIELD PROGRAMMABLE GATE ARRAY

(75) Inventor: Thomas A. Kean, Edinburgh (GB)

(73) Assignee: Algotronix, Ltd., Edinburgh (GB)

( * ) Notice: Subject to any disclaimer, the term of this patent is extended or adjusted under 35 U.S.C. 154(b) by 1059 days.

(21) Appl. No.: 09/747,759

(22) Filed: Dec. 21, 2000

(65) Prior Publication Data

US 2001/0015919 A1    Aug. 23, 2001

Related U.S. Application Data

(60) Provisional application No. 60/181,118, filed on Feb. 8, 2000.

(30) Foreign Application Priority Data

Dec. 22, 1999   (GB)   ................................ 9930145.9

(51) Int. Cl.
*G06F 11/30* (2006.01)
(52) U.S. Cl. ........................ 713/189; 713/190; 713/193
(58) Field of Classification Search ................ 713/189, 713/200, 201, 165, 164, 150, 193, 190; 380/255
See application file for complete search history.

(56) References Cited

U.S. PATENT DOCUMENTS

| | | | |
|---|---|---|---|
| 4,120,030 A | 10/1978 | Johnstone | |
| 4,465,901 A | 8/1984 | Best | |
| 4,525,599 A | 6/1985 | Curran et al. | |
| 4,562,305 A | 12/1985 | Gaffney | |
| 4,603,381 A | 7/1986 | Guttag | |
| 4,633,388 A | 12/1986 | Chiu | |
| 4,847,902 A | 7/1989 | Hampson | |
| 4,866,769 A | 9/1989 | Karp | |
| 4,878,246 A * | 10/1989 | Pastor et al. | .................. 380/44 |
| 5,036,468 A * | 7/1991 | Roselli | ........................ 701/20 |
| 5,224,166 A | 6/1993 | Hartmann, Jr. | |

(Continued)

FOREIGN PATENT DOCUMENTS

DE    43 41 880 A1    6/1995

(Continued)

OTHER PUBLICATIONS

"Xilinx—A New Family of In-system Programmable FLASH Serial/Parallel PROMs", Jan. 12, 2000, [Retrieved from Internet Jul. 6, 2004], "http://www.xilinx.com/xcell/xl34/xl34_21.pdf".*

(Continued)

*Primary Examiner*—David Jung
(74) *Attorney, Agent, or Firm*—Orrick, Herrington & Sutcliffe LLP

(57) ABSTRACT

A field programmable gate array (70) has security configuration features to prevent monitoring of the configuration data for the field programmable gate array. The configuration data is encrypted by a security circuit (64) of the field programmable gate array using a security key (62). This encrypted configuration data is stored in an external non-volatile memory (32). To configure the field programmable gate array, the encrypted configuration data is decrypted by the security circuit (64) of the field programmable gate array using the security key stored in the field programmable gate array.

95 Claims, 6 Drawing Sheets

U.S. PATENT DOCUMENTS

| | | | |
|---|---|---|---|
| 5,307,318 A | 4/1994 | Nemoto | |
| 5,349,249 A | 9/1994 | Chiang | |
| 5,386,469 A | 1/1995 | Yearsley | |
| 5,388,157 A | 2/1995 | Austin | |
| 5,596,512 A * | 1/1997 | Wong et al. | 702/63 |
| 5,644,638 A | 7/1997 | Thiriet | |
| 5,768,372 A | 6/1998 | Sung | |
| 5,773,993 A | 6/1998 | Trimberger | |
| 5,835,402 A | 11/1998 | Rao | |
| 5,898,776 A | 4/1999 | Apland | |
| 5,915,017 A | 6/1999 | Sung | |
| 5,946,478 A | 8/1999 | Lawman | |
| 5,954,817 A | 9/1999 | Janssen et al. | |
| 5,963,104 A | 10/1999 | Buer | |
| 5,970,142 A | 10/1999 | Erickson | |
| 5,978,476 A | 11/1999 | Redman et al. | |
| 5,991,880 A | 11/1999 | Curd | |
| 6,005,943 A | 12/1999 | Cohen et al. | |
| 6,020,633 A | 2/2000 | Erickson | |
| 6,028,445 A | 2/2000 | Lawman | |
| 6,044,025 A | 3/2000 | Lawman | |
| 6,049,222 A | 4/2000 | Lawman | |
| 6,061,449 A | 5/2000 | Candelore | |
| 6,118,869 A | 9/2000 | Kelem | |
| 6,141,756 A | 10/2000 | Bright | |
| 6,151,677 A | 11/2000 | Walter et al. | |
| 6,198,303 B1 | 3/2001 | Rangasayee | |
| 6,212,639 B1 | 4/2001 | Erickson | |
| 6,233,717 B1 * | 5/2001 | Choi | 714/805 |
| 6,292,018 B1 | 9/2001 | Kean | |
| 6,324,286 B1 * | 11/2001 | Lai et al. | 380/29 |
| 6,324,288 B1 | 11/2001 | Hoffman | |
| 6,324,676 B1 | 11/2001 | Burnham et al. | |
| 6,325,292 B1 | 12/2001 | Sehr | |
| 6,356,637 B1 * | 3/2002 | Garnett | 380/265 |
| 6,560,743 B2 | 5/2003 | Plants | |
| 6,615,349 B1 * | 9/2003 | Hair | 713/165 |
| 6,640,305 B2 | 10/2003 | Kocher et al. | |
| 6,658,566 B1 | 12/2003 | Hazard | |
| 6,857,076 B1 | 2/2005 | Klein | |
| 6,947,556 B1 | 9/2005 | Matyas et al. | |
| 6,957,193 B2 | 10/2005 | Stefik et al. | |
| 6,978,021 B1 | 12/2005 | Chojnacki | |
| 2002/0141588 A1 | 10/2002 | Rollins | |
| 2004/0111631 A1 | 6/2004 | Kocher et al. | |

FOREIGN PATENT DOCUMENTS

| | | |
|---|---|---|
| DE | 199 20 744 A1 | 11/2000 |
| WO | WO 97/25675 A1 | 7/1997 |
| WO | WO 98/40853 A1 | 9/1998 |
| WO | WO 98/58305 A1 | 12/1998 |
| WO | WO 99/46774 A1 | 9/1999 |
| WO | WO 00/49717 A2 | 8/2000 |
| WO | WO 01/08411 A1 | 2/2001 |

OTHER PUBLICATIONS

"TCP/IP Security", Jun. 12, 1998, [Retrieved from Internet Jul. 6, 2004], "http://www.linuxsecurity.com/resource_files/documentation/tcpip-security.html".*

Bruce Schneier, 1996, John Wiley & Sons, Inc., "Applied Cryptography", pp. 173, 2, 359.*

"Xilinx Xc4000 Field Programmable Gate Arrays", Oct. 18, 1999, [Retrieved from Internet Jul. 6, 2004].*

Massoud Pedram, "Design Considerations for Battery-Powered Electronics", 2000, [Retrieved from Internet Feb. 24, 2005],http://atrak.usc.edu/~massoud/Papers/battery-dac99.pdf.*

An energy/security scalable encryption processor using an embedded variable voltage DC/DC converter Goodman, J.; Dancy, A.P.; Chandrakasan, A.P.; Solid-State Circuits, IEEE Journal of vol. 33, Issue 11, Nov. 1998 pp. 1799-1809.*

Energy-efficient encoding for HDCP protected digital LCD interfaces Chakraborty, A.; Macii, E.; Poncino, M.; Signals, Circuits and Systems, 2005. ISSCS 2005. International Symposium on vol. 1, Jul. 14-15, 2005 pp. 19-22 vol. 1.*

VLSI cellular array of coupled delta-sigma modulators for random analog vector generation Cauwenberghs, G.; Signals, Systems & Computers, 1997. Conference Record of the Thirty-First Asilomar Conference on vol. 2, Nov. 2-5, 1997 pp. 1151-1155 vol. 2.*

Xilinx Inc.., "Xilinx User Guide and Tutorials", 1991, Section "The Best of Xcell", p. 602, column headed "Design Security".

Xilinx Inc.., "XACT Reference Guide", 1993, Section 5 "Peripherals and Hardware", p. 602, subsection headed "Programming the XC3720".

John G. Proakis , "Digital Communications", 3rd edition, McGraw Hill, 1995, Chapter 8. pp. 413-528.

John V. Oldfield and Richard C. Dorf, "Field Programmable Gate Arrays", Wiley-Interscience, 1995, Chapter 3, pp. 53-102.

Bruce Schneier, "Applied Cryptography", 2nd Edition. John-Wiley, 1996.

Actel Corp., "Protecting your Intellectual Property from the Pirates", presentation at DesignCon '98, 1998.

Atmel Corp., application note "Programming Specification for Atmel's AT17 and AT17A series FPGA configuration EEPROMs", 1999.

Triscend Inc., "Triscend E5 Configurable Processor Family", Product Description (Preview), Jul. 1999. Section "System Initialisation" p. 39-43.

Actel Corp., "60RS Family SPGA's", Advanced Data Sheet, Nov. 19, 1999.

Xilinx Inc., "Virtex 2.5V Field Programmable Gate Arrays," Advanced Product Specification, 1999, pp. 1-22.

Triscend Inc., "Implementing Secure Remote Updates using Triscend E5 Configurable System-on-Chip Devices", Application Note AN-02, Jan. 2000.

Intel Corp., "Intel Processor Identification and the CPU-ID Instruction", Application Note AP-485, Intel Corporation, Nov. 2000.

Dipert, Brian, Cunning Circuits Confound Crooks, EDN, Oct. 12, 2000, pp. 103-112.

Xilinx Inc., "Xilinx User Guide and Tutorials", 1991, Section "The Best of Xcell", p. 602, column headed "Design Security".

Xilinx Inc., "XACT Reference Guide", 1993, Section 5 "Peripherals and Hardware", subsection headed "Programming the XC3720".

Oldfield, John V., et al., "Field Programmable Gate Arrays", Wiley-Interscience, 1995, Chapter 3, pp. 53-102.

Atmel Corp., Application Note "Programming Specification for Atmel's AT17 and AT17A series FPGA Configuration EEPROMs", 1999.

Triscend Inc., "TRISCEND E5 Configurable Processor Family", Product Description (Preview), Jul. 1999, Section "System Initialisation", pp. 39-43.

Actel Corp., "60RS Family SPGA's", Advanced Data Sheet, Nov. 19, 1999.

Xilinx Inc., "Virtex 2.5V Field Programmable Gate Arrays", Advanced Product Specification, 1999, pp. 1-12.

Triscend Inc, "Implementing Secure Remote Updates Using Triscend E5 Configurable System-on-Chip Devices", Application Note AN-02, Jan. 2000, pp. 1-16.

Intel Corp., "Intel Processor Identification and the CPU-ID Instruction", Application Note AP-485, Intel Corporation, Nov. 2000.

* cited by examiner

Figure 4 - PRIOR ART

METHOD AND APPARATUS FOR SECURE CONFIGURATION OF A FIELD PROGRAMMABLE GATE ARRAY

This application claims priority to United Kingdom application GB9930145.9, filed Dec. 22, 1999, and U.S. provisional patent application No. 60/181,118, filed Feb. 8, 2000, which are incorporated by reference along with all references cited in this application.

BACKGROUND OF THE INVENTION

This invention relates to integrated circuits such as field programmable gate arrays which contain an on-chip volatile program memory which must be loaded from an off-chip nonvolatile memory when power is applied before normal operation of the device can commence. And more specifically, the invention relates to secure configuration and security features for field programmable gate arrays.

Field programmable gate arrays (FPGAs) constitute a commercially important class of integrated circuit which are programmed by the user to implement a desired logic function. FPGAs include user-configurable logic that is programmable by a user to implement the user's designed logic functions. This user programmability is an important advantage of FPGAs over conventional mask programmed application specific integrated circuits (ASICs) since it reduces risk and time to market.

The function of the FPGA is determined by configuration information stored on the chip. Several technologies have been used to implement the configuration store: most notably static random access memory (SRAM), antifuse and Flash erasable programmable read only memory (EPROM). The SRAM programmed FPGAs have dominated in the marketplace since they have consistently offered higher density and operating speed than devices using the other control store technologies. SRAM devices can be implemented on standard complementary metal oxide semiconductor (CMOS) process technology whereas antifuse and Flash EPROM technologies require extra processing steps. SRAM devices are normally built on process technology a generation ahead of that used in the other devices. For example, today the most advanced SRAM programmed FPGAs are available implemented on 0.18 micron technology whereas the most advanced nonvolatile FPGAs are on 0.25 micron technology. The smaller transistors available on the advanced processes provide a speed and density advantage to SRAM programmed FPGAs. Additional details of the operation of FPGAs and their control memory are given in standard textbooks including John V. Oldfield and Richard C. Dorf "Field Programmable Gate Arrays", published by Wiley-Interscience in 1995.

Unlike antifuse and FLASH EPROM which maintain their state after power is turned off, SRAM is a volatile memory which loses all information on power off. Therefore, SRAM programmed FPGAs must have a configuration bitstream loaded into them immediately after power is applied: normally this configuration information comes from a serial EPROM. A serial EPROM is a small, nonvolatile memory device which is often placed adjacent to the FPGA on the board and which is connected to it by a small number of wires. The programming information may also come from a parallel access EPROM or other type of memory or a microprocessor according to the requirements of the system containing the FPGA.

A shortcoming of FPGAs, especially SRAM programmed FPGAs, is a lack of security of the user's design because the configuration bitstreams may be monitored as they are being input into the FPGA. This security issue is one of the few remaining advantages of FPGAs based on nonvolatile memory over SRAM programmed FPGAs. It is very difficult to "clone" a product containing a mask programmed ASIC or one of the nonvolatile FPGAs. Cloning an ASIC involves determining the patterning information on each mask layer which requires specialist equipment and a significant amount of time. It is also difficult to copy configuration information loaded into the nonvolatile FPGA technologies after their "security fuses" have been blown—thus these devices are attractive to customers who have concerns about their design being pirated or reverse engineered. Vendors of FPGAs which use nonvolatile programming memory often refer to the security advantages of their technology over SRAM programmed parts in their marketing literature. As an example, "Protecting Your Intellectual Property from the Pirates" a presentation at DesignCon 98 by Ken Hodor, Product Marketing Manager at Actel Corporation gives the view of the major vendor of antifuse FPGAs on the relative security of antifuse, FLASH and SRAM based FPGAs.

This security problem of SRAM FPGAs has been well known in the industry for at least 10 years and to date no solution attractive enough to be incorporated in a commercial SRAM FPGA has been found. Some users of SRAM FPGAs have implemented a battery back up system which keeps the FPGA powered on in order to preserve its configuration memory contents even when the system containing the FPGA is powered off. The FPGA bitstream is loaded before the equipment containing it is shipped to the end user preventing unauthorized access to the bitstream information. Present day FPGAs have a relatively high power consumption even when the user logic is not operating: which limits the life span of the battery back up. If power is lost for even a fraction of a second the system the FPGA control memory will no longer be valid and the system will cease to function. This raises concerns about the reliability of a system which uses this technique. Thus, this prior art approach to protecting FPGA bitstreams is only applicable to a small fraction of FPGA applications.

As can be appreciated, there is a need for improved techniques and circuitry for secure configuration of FPGAs.

SUMMARY OF THE INVENTION

The invention is a field programmable gate array with security configuration features to prevent monitoring of the configuration data for the field programmable gate array. The configuration data is encrypted by a security circuit of the field programmable gate array using a security key. This encrypted configuration data is stored in an external nonvolatile memory. To configure the field programmable gate array, the encrypted configuration data is decrypted by the security circuit of the field programmable gate array using the security key stored in the field programmable gate array.

In an embodiment, the invention is a method of operating an integrated circuit. In a specific embodiment, the integrated circuit is a field programmable gate array. A stream of data including unencrypted configuration data is input to the integrated circuit. The unencrypted configuration data is encrypted using a security circuit of the integrated circuit and a security key stored in the integrated circuit. A stream of encrypted configuration data is output from the integrated circuit. The stream may be input serially. The stream of configuration data may include a header indicating the configuration data is unencrypted. The stream of configuration data may include a preamble, header, initial value, configuration data, and message authentication code portions. The stream of data may be loaded using a JTAG interface of the integrated circuit. The stream of data may be provided using a microprocessor. The integrated circuit is configured using the unencrypted configuration data.

Furthermore, the stream of encrypted configuration data is input from the nonvolatile storage device to the integrated circuit. The encrypted configuration data is decrypted using the security circuit of the integrated circuit and the security key. The integrated circuit is configured with a decrypted version of the encrypted configuration data. The unencrypted configuration data may have approximately the same number of bits as the encrypted configuration data. Information in the preamble may be used to indicate whether the configuration data of the stream is encrypted or unencrypted.

The security key is generated using a random number generator circuit of the integrated circuit. The security key is stored in a device ID register of the integrated circuit. The ID register may be nonvolatile. The ID register may be backed up using an external battery. The external battery is connected to a first power supply terminal to the ID register, and a second power supply terminal for nonbacked up circuits is not connected to the external battery.

The ID register may include floating-gate transistors. The ID register may be programmed during manufacture or fabrication of the field programmable gate array. The ID register may be programmed using a laser. The ID register may be programmed using a high voltage. The device ID register may be implemented using an error correcting code scheme.

In an embodiment, the security key has a fixed value. An initial value is generated for the security circuit. The initial value is output from the field programmable gate array. The unencrypted configuration data is encrypted using the initial value. The initial value may also generated using a random number generator.

The security circuit may encrypt the unencrypted configuration data using the triple data encryption standard algorithm in a cipher block chaining mode algorithm.

Based on the preamble, the integrated circuit can determine whether the stream of data is for a previous version of the integrated circuit, without a security scheme, or the stream of data is for a version of the integrated circuit with the security scheme. Using the preamble, a integrated circuit with a security scheme will be backwards compatible with versions of the integrated circuit without the security scheme. This provides a backwards compatibility feature allowing chips with the security circuitry to be used with configurations generated for previous generation chips without security circuitry.

In one particular embodiment, when the preamble is a first value, the stream of data is processed as a stream of data for a version of the integrated circuit without a security scheme. And when the preamble is a second value, different from the first value, the stream of data is processed as a stream of data for a version of the integrated circuit with the security scheme.

The stream of encrypted configuration data may be received using a microprocessor. The nonvolatile storage device may be a serial EPROM or serial EEPROM. The nonvolatile storage device may be a Flash memory.

In another embodiment, the invention is a method of operating a integrated circuit where first encrypted configuration data and a first security key are received from a network. The first encrypted configuration data is decrypted to obtain unencrypted configuration data using the first security key using configured user logic of the integrated circuit. Unencrypted configuration data is encrypted using a second security key and a security circuit of the integrated circuit to obtain second encrypted configuration data. The second encrypted configuration data is output from the integrated circuit.

The second encrypted configuration data may be stored in a nonvolatile storage device. The nonvolatile storage device may be a serial EPROM. The second security key may be stored in an ID register of the integrated circuit. The configured user logic outputs the unencrypted configuration data to the security circuit using an on-chip interconnection. The integrated circuit is configured using the unencrypted configuration data. The first encrypted configuration data is serially transferred to an I/O pin of the integrated circuit. The security circuit encrypts the unencrypted configuration data using a triple data encryption standard (DES) in a cipher block chain (CBC) mode algorithm.

In another embodiment, the invention is a field programmable gate array including a serial interface for loading initial configuration and key information. A battery-backed on-chip memory stores the cryptographic key. There is an on-chip triple-DES encryption circuit. And, there is an interface to an external nonvolatile memory for storing encrypted configuration data.

In another embodiment, the invention is a method for securely configuring an FPGA including loading key information into an on-chip battery-backed register. An initial configuration is loaded through a JTAG interface. An encrypted version of the configuration is stored in an external nonvolatile memory.

In another embodiment, the invention is a field programmable gate array including a plurality of static random access memory cells to store a configuration of user-configurable logic of the field programmable gate array. An ID register stores a security key. A decryption circuit receives and decrypts a stream of encrypted configuration data using the security key. The decryption circuit also generates decrypted configuration data for configuring the static random access memory cells. When power is removed from the first positive supply input pin, the configuration of the static random access memory cells is erased, while the security key stored in the ID register is maintained by the external backup battery. In a specific embodiment, the external backup battery only supplies power to the ID register. In a implementation, the decryption circuit decrypts the stream of encrypted configuration data using a triple-DES algorithm. There may be a random number generator circuit to generate the security key.

Furthermore, a first positive supply input pin of the field programmable gate array is connected to the static random access memory cells, user-configurable logic, and decryption circuit. A second positive supply input pin is connected to the ID register, where the second positive supply input is to be connected to an external backup battery. The current draw on the external backup battery may be about a microamp or less. The current draw on the external backup battery may be about 10 microamps or less.

Further features and advantages of the invention will become apparent from a consideration of the drawings and ensuing description.

DETAILED DESCRIPTION

Figure 1:
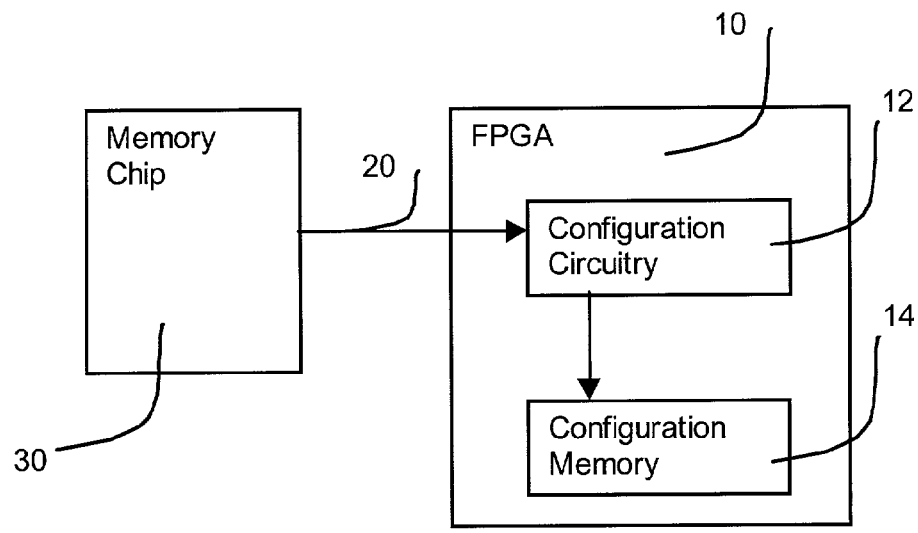
FIG. 1 shows a prior-art structure for configuring an FPGA from an external memory.

FIG. 1 shows a prior art SRAM programmed FPGA 10 connected to a memory chip 30 via a set of signal traces 20 on a printed circuit board. Configuration circuitry 12 on the FPGA loads programming data from memory 30 into on-chip configuration memory 14. Resources on the FPGA not related to programming (such as the logic gates and routing wires which implement the user design) are not shown in this or subsequent illustrations for reasons of clarity but are well understood and are described in manufacturer's literature such as Xilinx Inc. "Virtex 2.5V Field Programmable Gate Arrays, " Advanced Product Specification, 1998 and the Oldfield and Dorf textbook mentioned above. Set of signals 20 will normally include a data signal to transfer configuration information, a clock signal to synchronize the transfer and several control signals to specify a particular mode of transfer (for example when a sequence of FPGAs can be "daisy chained" to a single source of programming data). The exact number and function of programming signals 20 varies from manufacturer to manufacturer and product line to product line. The specific signals for a market-leading FPGA product are documented in the Xilinx literature cited above.

Programming signals 20 can be monitored by a malicious party who can then make a copy of the bitstream transferred across them. This could be done, for example, by attaching a probe or probes from a logic analyzer to those pins of FPGA 10 concerned with the programming interface.

Figure 2:
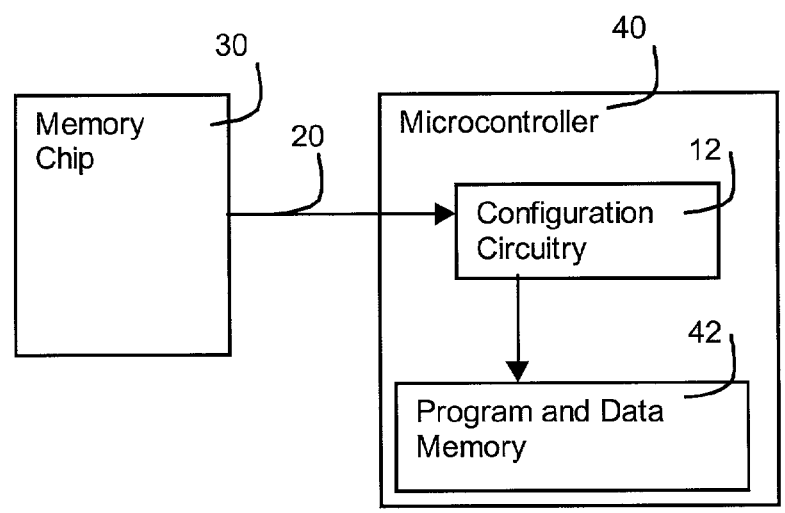
FIG. 2 shows a prior-art structure for configuring a microcontroller with on-chip program and data memory from an external memory.

FIG. 2 shows a prior art microcontroller 40 which contains configuration circuitry 12 to load initial values for an on-chip memory block 42 from a serial EPROM on power up. On-chip memory 42 may contain a program to be executed by the microcontroller or data tables for use by the microcontroller. Depending on the microcontroller architecture it might be convenient for memory 42 to be composed of several smaller memories: for example there may be separate memories for program code and data. The function of configuration circuitry 42 may be wholly or partly implemented by software running on the microcontroller and stored in an on-chip mask programmed Read Only Memory (ROM). The security problem is the same as that faced by the FPGA: an attacker can copy the programming information as it passes between the external memory and the microcontroller on chip SRAM memory.

Recently, Configurable System on Chip (CSoC) devices have become available commercially which contain both a microcontroller with a volatile on-chip program memory and a block of SRAM programmed logic: both the microcontroller program memory and the programmable logic configuration memory must be loaded from an external nonvolatile memory on power on. Details of one such device are given in Triscend Corporation, "Triscend E5 Configurable Processor Family," Product Description (Preview), July 1999. The Triscend CSoC can be programmed from a serial EPROM in the same way as an FPGA but also offers a convenient additional feature illustrated in FIG. 3. Configuration data can be downloaded to the CSoC 50 through an industry standard Joint Test Action Group (JTAG) interface and the CSoC itself can then program an In System Programmable (ISP) external memory 32 with the data. The external memory could be an SRAM but would normally be a serial or parallel EPROM or Flash EPROM. The CSoC implements the programming algorithm for the nonvolatile memory: the on chip-microcontroller allows CSoC devices to implement relatively complex configuration algorithms in software. This feature simplifies manufacturing a system containing a CSoC since the ISP memory chip 32 need not be programmed prior to installation on the Printed Circuit Board (PCB).

There are two main ways in which a malicious party might make use of captured bitstream information. The more serious threat, at the present time, is that a pirate may simply copy the bitstream information and use it unchanged to make unauthorized copies or "clones" of the product containing the FPGA without any understanding of how the FPGA implements its function. The second threat is that the attacker might "reverse engineer" the design being loaded into the FPGA from bitstream information. Reverse engineering an FPGA design would require significant effort because automated tools for extracting design information from the bitstream are not generally available. Should such tools be created and distributed in the future reverse engineering would become a very serious threat.

This security issue is one of the few remaining advantages of FPGAs based on nonvolatile memory over SRAM programmed FPGAs. It is very difficult to "clone" a product containing a mask programmed ASIC or one of the nonvolatile FPGAs. Cloning an ASIC involves determining the patterning information on each mask layer which requires specialist equipment and a significant amount of time. It is also difficult to copy configuration information loaded into the nonvolatile FPGA technologies after their "security fuses" have been blown—thus these devices are attractive to customers who have concerns about their design being pirated or reverse engineered. Vendors of FPGAs which use nonvolatile programming memory often refer to the security advantages of their technology over SRAM programmed parts in their marketing literature. As an example, "Protecting Your Intellectual Property from the Pirates" a presentation at DesignCon 98 by Ken Hodor, Product Marketing Manager at Actel Corporation gives the view of the major vendor of antifuse FPGAs on the relative security of antifuse, FLASH and SRAM based FPGAs.

This security problem of SRAM FPGAs has been well known in the industry for at least 10 years and to date no solution attractive enough to be incorporated in a commercial SRAM FPGA has been found. Some users of SRAM FPGAs have implemented a battery back up system which keeps the FPGA powered on in order to preserve its configuration memory contents even when the system containing the FPGA is powered off. The FPGA bitstream is loaded before the equipment containing it is shipped to the end user preventing unauthorized access to the bitstream information. Present day FPGAs have a relatively high power consumption even when the user logic is not operating: which limits the life span of the battery back up. If power is lost for even a fraction of a second the system the FPGA control memory will no longer be valid and the system will cease to function. This raises concerns about the reliability of a system which uses this technique. Thus, this prior art approach to protecting FPGA bitstreams is only applicable to a small fraction of FPGA applications.

There are two main problems which have up till now prevented the industry from introducing security to SRAM programmed FPGAs.

Firstly, in order to provide security against pirated bitstreams, it is necessary that FPGAs are in some way different from each other and this difference must be present and consistent even after power is removed and restored. Only if the FPGAs are different in some way can it be assured that a bitstream intended for one FPGA and copied by a pirate will not function on a second FPGA in the "cloned" product. The most practical way to make the two FPGAs different is to provide a small nonvolatile memory on the device which contains a unique value.

The need for a nonvolatile memory to support security appears to remove the advantages that SRAM FPGAs have over antifuse or FLASH based FPGAs. If one can implement nonvolatile memory to store a unique identifier then it seems as if one could use it for all the configuration information. However, memory to store an identifier will require at most a few kilobits of nonvolatile memory where the device configuration memory may require several megabits on a state of the art device. There is also no need for the identifier memory to be high performance since it will rarely be accessed. Thus, it is possible to use circuit techniques which are compatible with normal CMOS processing for the nonvolatile memory but which result in memories which are relatively inefficient in terms of speed and density. In the simplest case the nonvolatile memory might be a set of conductive links which are selectively cut using a laser after manufacture in order to give each device a unique identifier.

A second problem with implementing a unique identifier on every FPGA and using this identifier to prevent a bitstream for one FPGA from successfully configuring a second is that it seriously complicates the manufacturing of equipment containing the FPGAs. It is necessary to create a different bitstream for each FPGA based on its unique identifier: therefore the CAD tools must keep track of the unique identifier of the device to be configured. This can cause serious inconvenience to the user and manufacturer of the FPGA.

Figure 4:
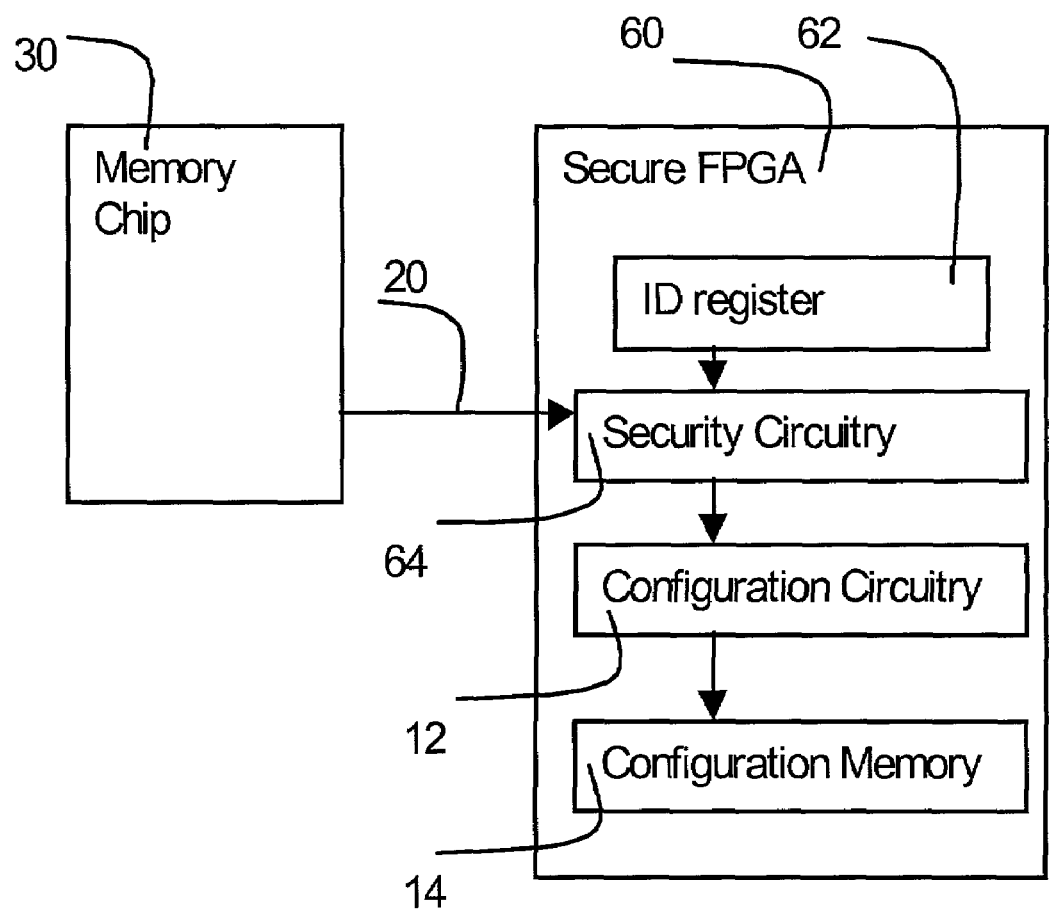
FIG. 4 shows a prior-art structure for securely programming an FPGA.

FIG. 4 shows an FPGA with security circuitry 64 and an on-chip nonvolatile ID memory 62. Security circuitry 64 is coupled between off-chip nonvolatile storage 30 and configuration circuitry 12 and is also coupled to the nonvolatile ID memory 62. The device manufacturer installs a unique key in the ID memory at the time of manufacture and provides this key to the customer who purchases the FPGA. The customer can then use this key to create a security enhanced encrypted bitstream for this particular FPGA and program this bitstream into serial EPROM. When configuration data is loaded into the FPGA security circuitry decrypts and verifies it using the key data in ID memory 62. In this case a malicious party who copied the bitstream passing between the FPGA and microcontroller would not be able to use this information to make a pirate copy of the user's equipment (since the secure FPGA bitstream would only configure the particular FPGA it was generated for). If the security algorithm involved encrypting the bitstream it would also be impossible or very difficult for the malicious party to reverse engineer the customer design.

This form of bitstream security causes inconvenience to both the FPGA manufacturer and customers. The manufacturer faces the following problems:

1. The FPGAs now require a customization stage after manufacturing to individualize the ID memory. This may involve, for example, cutting metal traces with a laser, or programming on chip antifuses or floating gate memory cells.

2. After customization the chips require a customized programming stream. This complicates testing since it is no longer possible to use identical vectors for each chip.

3. A security system must be put in place in the manufacturer's facility to protect the identifiers being installed into the chips.

4. The manufacturer must have a secure delivery method for supplying the secret identifiers to the customers who purchased the FPGAs in an easy to use manner. It must also be easy for the customer to match the identifiers supplied with the particular device being programmed in an automated manufacturing environment.

The customer also faces additional problems:

1. The customer must provide a secure environment for handling and storing the device IDs.

2. The customer must have a database or other system which allows them to find the correct ID for a given chip each time it is to be reprogrammed and supply the ID to the bitstream generation Computer Aided Design (CAD) program. This will be of particular concern in the development process or when making improvements or corrections to products in the field.

3. It is not possible to batch program many serial EPROMs with a common configuration prior to assembly onto the printed circuit board. The fact that each serial EPROM must contain a different configuration thus complicates equipment manufacturing.

4. The customer must trust the FPGA manufacturer since the manufacturer has access to the ID information and could, in theory, decrypt the bitstream for any customer design.

It can be seen that keeping the device IDs secure is a significant practical problem which would cause considerable inconvenience to FPGA manufacturers and their customers. The security infrastructure makes it harder to make use of one of the benefits of SRAM based FPGAs: their ability to be reprogrammed many times. Standard FPGAs with no bitstream security do not require tracking of individual chip ID codes in order to create a usable bitstream. The fact that the device IDs must be stored on computer systems at both the FPGA manufacturer and customer and kept available in case reprogramming is required potentially compromises security by providing opportunities for unauthorized access to key information.

Although the above discussion has focussed on FPGAs, since these are the most commercially important class of integrated circuit which make use of a volatile on-chip program memory it is applicable to any integrated circuit which must load an on-chip volatile program memory from an off-chip nonvolatile memory. This might include other forms of programmable logic such as Complex Programmable Logic Devices, routing chips such as Field Programmable Interconnect Components (FPICs) or microcontrollers which use a block of on chip SRAM to store program code. It would also be applicable to hybrid components like the CSoC mentioned above which had more than one class of SRAM programmed circuit: for example chips which contain a microcontroller and an SRAM programmed FPGA. It would be obvious to one skilled in the art that the method of securely configuring an FPGA described here could equally well be applied to these other classes of component.

Figure 5:
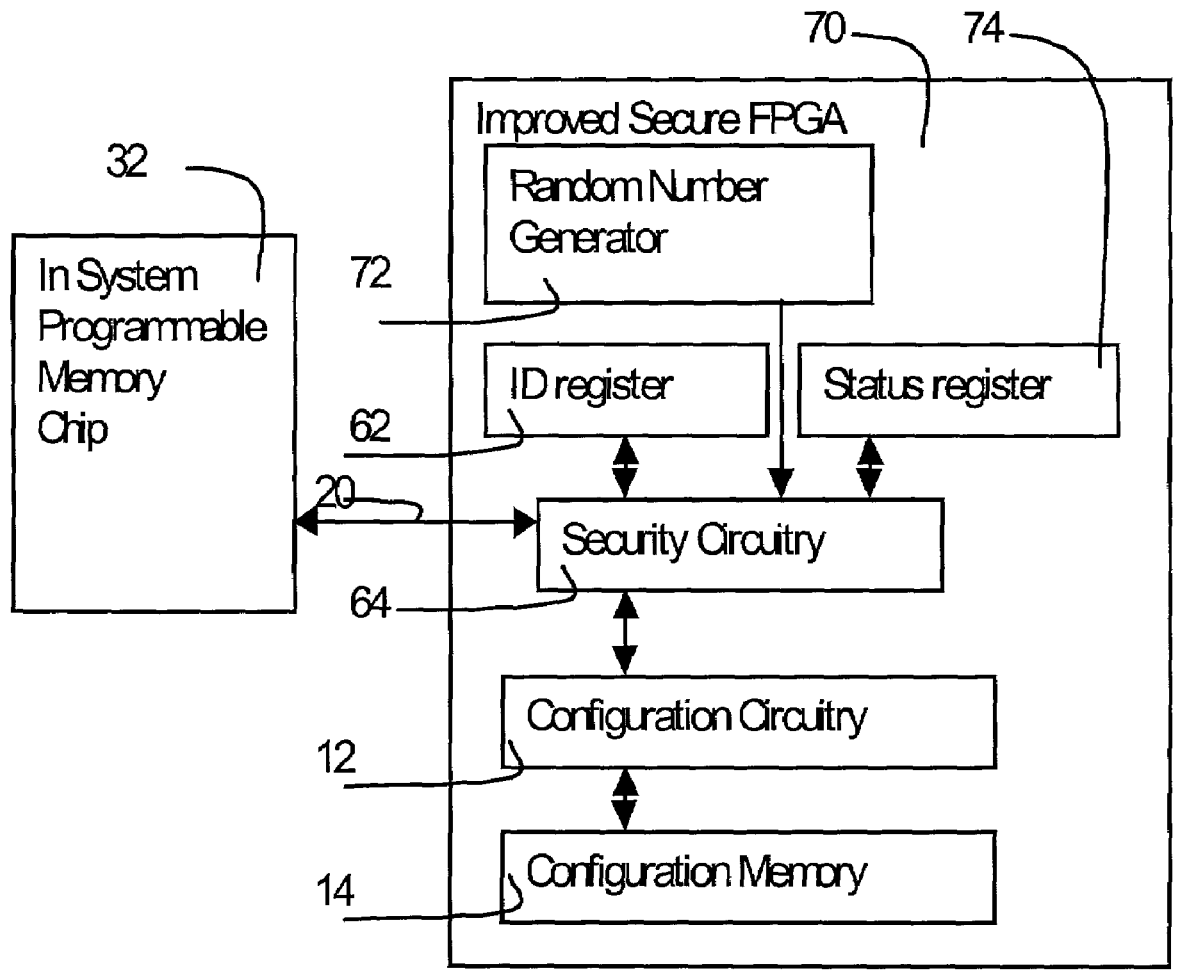
FIG. 5 shows a secure FPGA according to this invention.

FIG. 5 shows an improved secure FPGA 70 according to this invention which provides the security of the FPGA 60 in FIG. 4 without compromising ease of use. For reasons of clarity resources on the FPGA not related to programming are not shown. Random number generator 72 is coupled to the security circuitry 64 and can be used to generate a random ID code. Such a code should be at least 40 bits long and would preferably be between 100 and 200 bits. The ID code acts as a cryptographic key and the normal considerations applicable to choosing the length of a cryptographic key would apply. As compute power increases in the future longer keys lengths may be required. With a sufficiently long ID code and a high quality random number generator it is extremely unlikely that two FPGAs would generate the same ID. Security circuitry 64 can load the ID code into the device ID register 62 and it can also read the ID code from the register when required. The device ID register is nonvolatile and its contents are preserved when the power is removed from the FPGA. Only the security circuitry 64 can access the output of the ID register: the value stored in the ID register is never available off-chip. Security circuitry 64 is also coupled to the off chip nonvolatile ISP memory 32 and the configuration circuitry 12. Security circuitry 64 and configuration circuitry 12 process data coming from the off chip memory prior to writing it to the on-chip memory in the same way as the system of FIG. 4. Additionally, in the improved secure FPGA 70, security circuitry 64 and configuration circuitry 12 can also process data read out of on chip configuration memory 14 encrypt it and write it to the off chip in-system programmable memory 32 through signals 20. This encryption can use the ID value stored in the ID register as a key. Status Register 74 is provided in a preferred embodiment as a small nonvolatile memory for use by the security circuitry to store the configuration status of the device while power is not applied, this allows extra flexibility in device configuration.

To appreciate the benefit of the structure presented in FIG. 5 it is necessary to consider the various stages in the life of an SRAM FPGA chip. As an illustration we will assume that the FPGA chip is sold to a customer in the computer networking industry who uses it in an Internet Protocol (IP) router product. This example is provided only to make the concepts being discussed more concrete, the invention is not limited to any particular application area of FPGA chips.

1. Manufacture. When it leaves the manufacturer's premises the FPGA is completely functional but does not contain any kind of proprietary design. Thus, there is no need to be concerned that bitstream information might be copied or pirated at this stage.

2. Customer Programming. The FPGA customer installs the FPGA chip in equipment which is to be supplied to its own customers (the "end users" of the FPGA). For example, in this case the FPGA chip might be installed on a printed circuit board which forms part of an IP router. This customer must also develop a proprietary design to configure the FPGA to implement the functions required by the IP router and store the bitstream (created using Computer Aided Design (CAD) tools supplied by the FPGA manufacturer) in a nonvolatile memory within the system. It is this bitstream information which must be protected from piracy or reverse engineering.

3. End User. The FPGA customer supplies their IP router product to an end user. After it leaves the FPGA customer's premises the equipment containing the FPGA may fall into the hands of a malicious party who wishes to pirate or reverse engineer the customer FPGA design. A pirate who obtains a copy of the bitstream could then build "clones" of the customer's IP protocol router product containing FPGAs which were loaded with the pirated bitstream.

As described above the purpose of the security circuitry is to prevent sensitive information from appearing on signals 20 which may be monitored by a malicious party. However, as can be seen from the description of the FPGAs lifecycle this is only a concern after the equipment containing the FPGA leaves the FPGA customer's facility. The FPGA customer has created the design in the FPGA and can access all the CAD files (including schematics or VHDL source and the bitstream itself) associated with it, therefore, there is no reason to protect the FPGA bitstream while the FPGA is within the customer's premises.

Normally, an FPGA customer will power up a system containing an FPGA in their facility prior to shipping it to the end user in order to test that it is functional. If the customer always powers on the equipment within his facility before shipping the equipment the signals 20 may transmit sensitive information the first time the FPGA is powered up in the system, however, subsequent transfers of data across the signals 20 must be protected.

This observation leads to a method for using the structure of FIG. 5 to implement bitstream security consisting of the following steps:

1. The customer places a standard, insecure, FPGA bitstream in the nonvolatile memory. This bitstream contains a small amount of header information which indicates to the FPGA that it is an insecure bitstream but should be converted into a secure one.

2. The FPGA security circuitry loads the FPGA bitstream and determines, based on the header information, that security must be applied. It also determines that the bitstream is insecure and passes it directly to the FPGA configuration circuitry without change.

3. The FPGA security circuitry causes the random number generator to create a new key and loads this key into the device ID register.

4. After the entire FPGA is configured the security circuitry reads back the bitstream information from the configuration memory and processes it, based on the key information in the device ID register, to form a secure bitstream. This secure bitstream is then written back to the off chip nonvolatile memory overwriting and obliterating the original insecure bitstream information. The header information on this new secure bitstream is changed to indicate that it is a secure bitstream.

After this step a link has been established between the FPGA and the off chip nonvolatile memory: the bitstream in the off chip memory will not successfully configure any other FPGA. The unencrypted form of the bitstream is no longer present in the external memory. Since the bitstream is encrypted accessing the bitstream will not help in reverse engineering the user design. After these steps the FPGA is properly configured and operating normally allowing the equipment to be tested. Power will be removed before the product containing the FPGA is shipped to the end user. The next time power is applied to the FPGA (which may happen outside the customer's premises) the following steps will take place:

1. The FPGA begins to load the secure bitstream from the nonvolatile memory and determines from the header flags that it is a secure bitstream.

2. The security circuitry processes the secure bitstream using the secret information in the device ID register to verify it and create a standard insecure bitstream.

3. This standard bitstream is passed on to the configuration circuitry which loads it into the configuration memory.

4. Assuming the security circuitry does not detect any problems with the bitstream the FPGA is enabled and operates normally after configuration. If a problem is detected the security circuitry might blank the on chip configuration memory and disable the user input/output pins or take other appropriate steps to ensure the spurious design is not activated.

At any time the user can reprogram the external memory with a new design: if security is required the FPGA will generate a new ID code and encrypt it using the method outlined above.

This invention provides a cryptographic security protocol which prevents unauthorized third parties from either reverse engineering or making functional pirate copies of FPGA bitstreams. This invention further provides security without compromising the ease of manufacture of the SRAM FPGAs, without complicating the Computer Aided Design tools for the SRAM FPGAs and without removing the user's ability to reprogram the SRAM FPGAs many times.

Advantages of this method of securing FPGA bitstreams include:

1. The cryptographic key is never transferred outside the chip making it very difficult for unauthorized parties to obtain its value.

2. The FPGA CAD tools need only produce standard, unencrypted bitstreams and need not keep track of device identifiers.

3. The user may change the design to be implemented by the FPGA at any time simply by reconfiguring the external memory with a new design.

4. A manufacturer may install identically configured serial EPROMs on all boards without compromising security, provided that the boards are powered on at least once before leaving his facility.

5. The technique is "upwards compatible" with existing methods of configuring FPGAs: thus an FPGA can be created which is compatible with prior art bitstreams as well as supporting this secure technique.

Thus, this technique provides the design security offered by nonvolatile FPGA technologies without compromising the density, performance or ease-of-use of SRAM FPGAs.

Bitstream Format

It will be appreciated that FPGAs are used in many different systems, for this reason modern FPGAs offer many configuration modes. These may include configuration directly from a serial EPROM, configuration in a chain of FPGAs from the next FPGA in the chain, configuration from a parallel EPROM and configuration from a microprocessor. In almost all cases, independent of the format in which the configuration information is presented to the pins of the FPGA it is converted inside the chip to a stream of ordered data bits which constitute the complete programming information for the memory. Therefore for the sake of clarity we will treat the configuration as a simple stream of serial data. Means for converting between the various parallel and serial configuration formats used in commercial FPGAs and a serial stream of data would be known to one skilled in the art.

Figure 6:
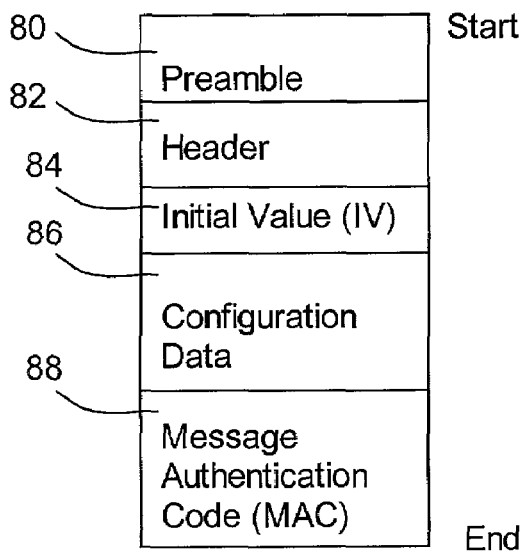
FIG. 6 shows a bitstream format for a secure FPGA according to this invention.

FIG. 6 shows a preferred format for bitstream information for a secure FPGA according to this invention. Data is loaded into the FPGA starting with the Preamble 80 and continues in order down to the Message Authentication Code (MAC) 88. The MAC 88 and initial value (IV) 84 are needed by a preferred cryptographic algorithm and will be discussed in a later section. Header 82 is discussed later this section. Configuration data 86 is simply an encrypted version of the normal configuration data for the FPGA architecture. The preferred encryption algorithms do not change the structure or length of the data they encrypt (except that a small number of padding bytes may be added).

The header information is not encrypted and specifies the class of bitstream information which follows. Possible classes of bitstream include:

1. Normal, unencrypted bitstream. The FPGA loads the bitstream directly into configuration memory in the same way as a prior-art SRAM programmed FPGA.

2. Unencrypted bitstream to be secured with randomly generated key. The FPGA loads the bitstream, generates a key using the on-chip random number generator, stores the key in on-chip nonvolatile memory, reads out the bitstream from configuration memory encrypts the bitstream and stores it back into the external memory, setting the header information to indicate a secure bitstream.

3. Unencrypted bitstream to be secured using the currently installed key. The FPGA loads the bitstream. If no key is currently installed, generates a key using the on-chip random number generator and stores the key in on chip nonvolatile ID register memory. It then reads out the bitstream from configuration memory encrypts the bitstream and stores it back into the external memory, setting the header information to indicate a secure bitstream.

4. Unencrypted bitstream to be secured using a specified key. In this case the key is included in the header information and is written directly to nonvolatile on chip memory. The FPGA then loads the unencrypted bitstream, reads it back out from configuration memory, and encrypts it using the key storing the encrypted bitstream with a header indicating a secure bitstream and without the key information back in the external memory.

5. Secure bitstream. The FPGA decrypts the bitstream using the key in the on-chip nonvolatile storage and loads the decrypted bitstream into configuration memory.

One of skill in the art would recognize that the class of bitstream information can be encoded in a small number of bits within header 82. Further, depending on the specific embodiment of the invention, it is not necessary for a secure FPGA to implement all the options outlined above. Depending on the classes of bitstream supported status register 74 may not be required.

When providing a bitstream to be secured an additional control bit is useful to specify that when the key register is written it should be locked down to prevent further changes. When lock down is used with a randomly generated key then it prevents the FPGA bitstream being changed—since the key will not be known off-chip. When lockdown is used with a specified key it prevents anyone who does not know that key from reprogramming the FPGA. The lockdown feature can be implemented using a bit in Status Register 74 to indicate to Security Circuitry 64 that the key should not be changed. This is particularly useful for FPGAs whose configuration information is to be updated at a distance—for example via the internet.

In some cases it may be desirable to make a secure FPGA which can also be configured by an insecure bitstream for a previous generation FPGA. FPGA bitstreams normally start with a "preamble" consisting of a sequence of words of a particular value, for example 55 (hexadecimal) 01010101

(binary). This preamble is used by the configuration circuitry to identify the start of the bitstream information. It is easy to specify a new preamble, for example CC (hexadecimal), 11001100 (binary) for bitstreams in the new format which contain security information. If this is done the FPGA can immediately determine whether it must load a bitstream for a prior-art FPGA without security information or a new format bitstream and process it accordingly.

External Nonvolatile Memory

Serial EPROMs which are based on In System Programmable (ISP) Flash EPROM technology are available from several suppliers including Atmel Corporation. These devices have the advantage that they can be programmed many times while operational in the system—unlike standard EPROM chips no special programming equipment is required. These devices are becoming popular since they allow a manufacturing flow in which the programming information is loaded after the board is assembled and also provide a means by which the programming information can be updated—for example to improve the product or correct errors. In System Programmable Flash memories with a conventional parallel interface are commodity components available from a large number of manufacturers.

The presently preferred embodiment of external memory 32 is an ISP programmable serial EPROM which allows an FPGA as described here to write out a new programming configuration to its nonvolatile memory. All that is necessary is that the FPGA contain circuitry which can implement the ISP nonvolatile memory programming specification. Atmel Corporation, application note "Programming Specification for Atmel's AT17 and AT17A series FPGA configuration EEPROMs", 1999 documents the requirements for one family of ISP serial EPROMs.

Some FPGA configuration modes allow for programming by a microprocessor or other device rather than a memory directly coupled to the FPGA. In this case the transfer of data is controlled by the external agent rather than the FPGA itself. The method of secure configuration described here can equally well be applied in this case provided that the microprocessor is programmed to read the new (encrypted) configuration information back from the FPGA. The microprocessor can easily determine whether encrypted bitstream information will be written back out by checking the header information in the bitstream file it transfers into the FPGA. The microprocessor must then write this encrypted information into some nonvolatile storage medium and erase the previous unencrypted bitstream information.

Figure 3:
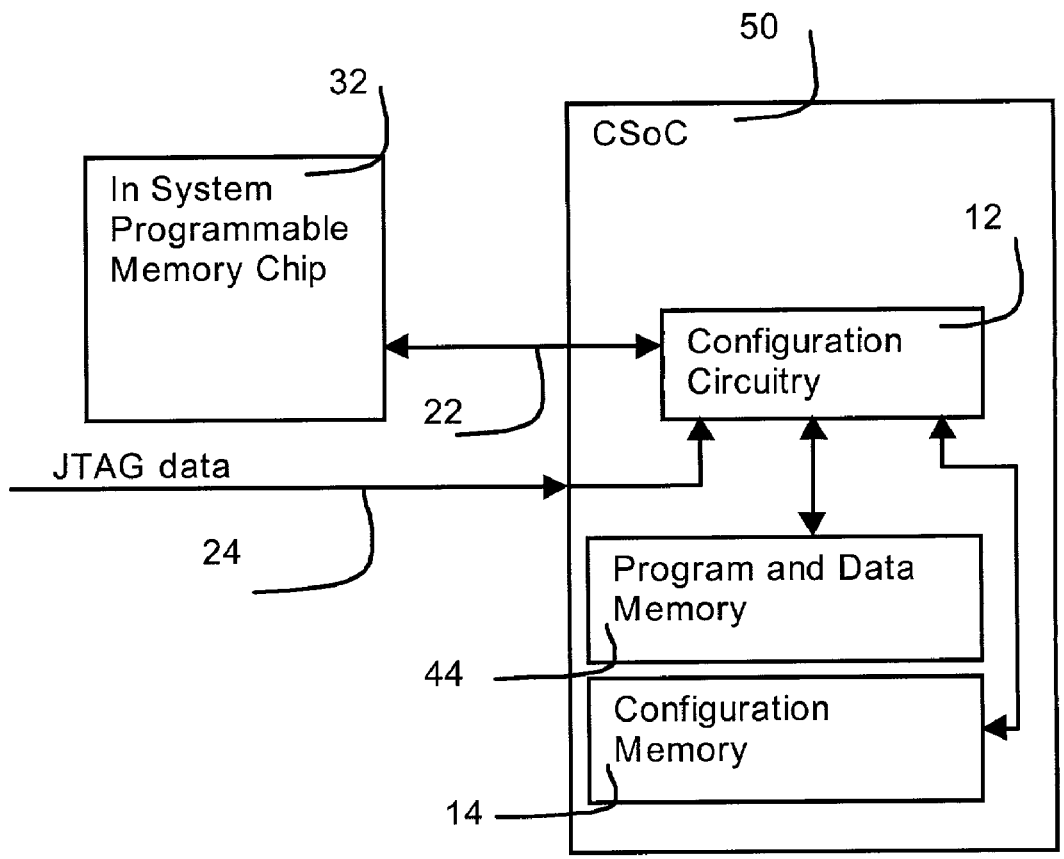
FIG. 3 shows a prior-art structure for configuring a Configurable System on Chip integrated circuit from an external memory.

Another interesting configuration mode, shown in FIG. 3, is offered in the Triscend E5 series CSoC whose data sheet was referenced above. In this mode a bitstream is downloaded to the E5 chip through a Joint Test Action Group (JTAG) interface during manufacture, the E5 chip itself then executes a programming algorithm to program the bitstream into an external EPROM or FLASH EPROM. This kind of flexibility is made possible by the fact that the E5 has an on-chip microcontroller not present on standard FPGAs. This mode of configuration can easily be secured using the technique of this invention—in this case the download of the insecure bitstream through the JTAG interface during manufacture replaces the initial loading of the insecure bitstream from the serial EPROM. The chip can encrypt the bitstream as it passes through and program the encrypted values into the external nonvolatile memory. Alternatively, the chip could program the on-chip configuration memory, then subsequently read back the configuration memory, encrypt the data and program the external memory.

Security Unit

Security circuitry 64 should be able to prevent secure configurations which have been illegally copied from being activated and protect customer designs by preventing reverse engineering of the bitstream. Some customers may only require protection from pirated bitstreams whereas other customers may be most worried about a competitor reverse engineering their design. Since cryptography is regulated by many governments it may be that the strongest practical cryptographic protection is not desirable commercially.

The textbook, "Applied Cryptography, " by Bruce Schneier 2nd Edition. John-Wiley, 1996 gives sufficient detail to allow one skilled in the art to implement the various cryptographic algorithms discussed below. It also includes computer source code for many of the algorithms.

The presently preferred technique for use in the security circuitry 64 is a symmetric block cipher in Cipher Block Chaining (CBC) mode. Many such ciphers are known in the art and would be suitable for this application including RC2, RC4, RC5 and IDEA. The best known such cipher is the Data Encryption Standard (DES). DES is often operated in a particularly secure mode called Triple DES in which the basic DES function is applied three times to the data using different keys: the details are presented on page 294 of the Schneier textbook referenced above.

Cipher Block Chaining mode is explained in detail in the section starting on page 193 of the Schneier textbook, the computation of the Message Authentication Code is described on page 456. These techniques have also been described in various national standards documents and are in common use in the industry.

Cipher Block Chaining mode has two important advantages in this application:

1. The feedback mechanism hides any structure in the data. FPGA configurations are very regular and large amounts of information about the design could be determined if a simpler cipher mode (for example Electronic Code Book (ECB)) was used in which the same input data would always be encrypted to the same output data. For example if the word 0 happened to occur very frequently in the bitstream (perhaps because 0 was stored in configuration memory corresponding to areas of the device not required by the user design) then the encrypted value for 0 would occur frequently in the output data. An attacker could easily determine which areas of the device were not used by the customer design simply by looking for a bit pattern which occurred very frequently.

2. The feedback value left at the end of the encryption can be used as a Message Authentication Code (MAC) in the same way as the value computed by a secure hash algorithm. The MAC is also appended to the bitstream and verified after decryption.

In a preferred embodiment of this invention, the Initial Value (IV) required in CBC mode is created using the on-chip random number generator and saved as part of the header before the configuration information. As shown in FIG. 6, the IV 84 is stored unencrypted as part of the bitstream, its function is to ensure that if the same, or a similar bitstream, is encrypted with the same key, a completely different set of encrypted data will be produced. The IV is particularly important if the on-chip key memory is implemented in a technology which can only be written once (for example antifuse). The IV is of less value in the situation where a new key is generated and stored each time a new bitstream must be secured as is the case in the preferred embodiment of this invention.

It should be noted that although the IV is preferably a random number this is not strictly necessary as long as it is ensured that a different IV will be used each time a bit stream is encrypted.

Many ciphers operate on fixed length blocks of data—For example DES operates on blocks of 8 bytes of data. If the length of the data to be encrypted is not a multiple of 8 bytes then it is necessary to "pad" the data out prior to encryption. This padding can easily be removed after decryption and is a maximum of 7 bytes long. Standardized techniques for applying and removing this padding are well known in the art.

Although triple DES in Cipher Block Chaining mode is the presently preferred embodiment of the security circuitry it will be appreciated by one skilled in the art that there is a very wide choice of suitable encryption functions. The choice of encryption function may be influenced by regulatory and patent licensing issues as well as technical requirements such as security, silicon area required for implementation and speed of processing. For example, alternative embodiments of this invention might use Cipher Feedback Mode (CFB) instead of CBC mode, a stream cipher instead of a block cipher or an alternative block cipher instead of DES.

ID Register

Figure 7:
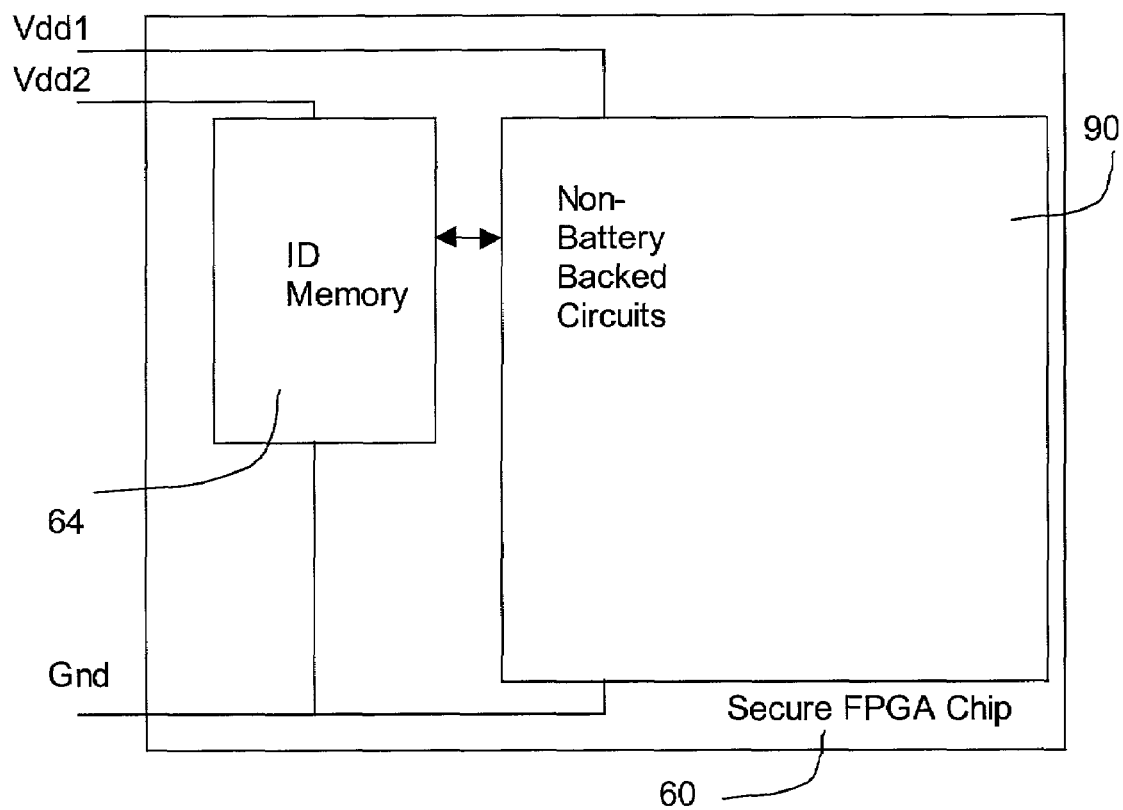
FIG. 7 shows a layout for an FPGA in which the device ID register is battery backed.

There are several ways of implementing nonvolatile ID register 62 and status register 74 for use with this invention:

1. Battery back up. When the main power supply to the FPGA is lost a separate battery maintains power to the ID register circuitry. In a prior-art technique, the battery provides power to the whole FPGA maintaining the state of the main configuration memory. In accordance with one embodiment of this invention a secure FPGA chip is implemented as shown in FIG. 7 so that the ID register 64 is contained in a separate area of the device with a dedicated power supply Vdd2. Power supply Vdd1 supplies non-battery backed circuits 90 on the device which may include the security and configuration circuits, the configuration memory and the user logic. Care must be taken with signals that cross between areas of the device powered by different supplies to ensure that power is not drawn from the battery backed circuits into the main circuit area when the main circuit is not powered. In a CMOS technology it is important to ensure that the parasitic diodes between areas of source/drain diffusion and the surrounding well or substrate located in an unpowered area of the chip but connected to a signal in a powered area cannot be forward biased. One way to do this is to ensure that outputs from the battery backed circuitry only connect to MOSFET gates in the main circuit and outputs from the main circuit only connect to MOSFET gates in the battery powered circuit. This implies there will be no connections which have source/drain diffusions on both sides. In this case the power drawn from the external battery via supply Vdd2 will be extremely small (on the order of microamps) since only a very small amount of circuitry is being powered: this will increase battery life and may allow an alternative energy source to be used which gives effectively unlimited battery life. Various such energy sources have been developed for use in powering watch circuits (e.g. kinetic generators and capacitors charged from small solar cells).

2. Floating gate memory cells. U.S. Pat. No. 5,835,402 to Rao and Voogel "Nonvolatile Storage for Standard CMOS Integrated Circuits" teaches a circuit technique by which small areas of nonvolatile memory using floating-gate transistors can be implemented on a standard CMOS process, normally such memories require higher voltages for programming and transistors which come in contact with these voltages require special processing to prevent gate-oxide breakdown. This is the presently preferred implementation technique for the on-chip nonvolatile memory.

3. Fuse or antifuse technologies. Fuse and antifuse technologies have been widely applied in programmable logic devices and would be suitable for use in this register. In addition it has been suggested that deliberately causing breakdown of transistor gate oxide by applying too high a voltage could be used to create a write-once nonvolatile memory.

4. Programming during manufacture. The FPGA manufacturer could program the ID register with a secret value during manufacture (for example by using a laser to cut links, or an externally generated high voltage to configure floating gate transistors or antifuses). This makes the circuit design of the FPGA less complex at the expense of some security since the customer must trust the FPGA manufacturer not to make improper use of its knowledge of the device ID.

Since it is highly desirable that conventional CMOS processing flow is used it may be that the nonvolatile memory cell technology (e.g. floating gate transistors) is less reliable than that implemented using special processing flows. Since the number of memory cells required is small (probably less than 200) it is possible to provide more memory cells than are strictly needed without significantly impacting chip area. This allows the use of error correcting codes (ECCs) to produce a reliable memory from a larger unreliable memory in the same way as coding is used to produce a reliable communications channel from a higher capacity unreliable channel. Error correcting codes are also commonly used with optical media such as CD-ROMs. There is a well developed theory of error correcting codes (see, for example, "Digital Communications" by Proakis, 3rd edition published by McGraw Hill, 1995) and a suitable code could be developed by one skilled in the art to suit the characteristics of a particular nonvolatile storage technology.

Random Number Generator

Random number generators have been developed for use on integrated circuits by many companies. They are a useful component of many common security systems, particularly, smart cards. Many prior art random number generators would be suitable for use in this invention.

A presently preferred implementation of an on-chip random number generator for use in this invention is disclosed in U.S. Pat. No. 5,963,104 to Buer "Standard Cell Ring Oscillator of a Nondeterministic Randomiser Circuit". This reference shows how to implement a cryptographically strong random number generator using only standard logic components from a standard cell library. It demonstrates that no specially designed analog components or special processing is required to implement a random number generator on a CMOS chip.

Configuration Circuitry

The secure FPGA requires that the security circuitry can encrypt the bitstream information and write it back out to the off-chip nonvolatile memory. This is most efficiently achieved by reading back the FPGA configuration memory. Most commercially available SRAM programmed FPGAs provide the ability to read back the bitstream from the control memory for diagnostic purposes so this does not require any special circuitry.

If a secure bitstream is loaded and off-chip circuitry requests read back of the on-chip memory using the programming interface the security circuitry must either block the request or encrypt the bitstream before passing it off-chip.

Implementation of Security Circuits

While in a presently preferred embodiment of this invention the security circuits above are implemented conventionally as a small mask programmed gate array on the integrated circuit there are other attractive ways of implementing them.

In another embodiment of this invention a small microcontroller on the die with an associated on chip Read Only Memory (ROM) to store program code is used to implement some or all of the programming and security functions.

In yet another embodiment areas of the FPGA itself are used to implement logic functions such as random number generators and encryptors. Bitstream information for these functions would be stored in an on chip ROM, in the same way as the microcontroller code in the previous embodiment. This technique is most practical with FPGAs which support partial reconfiguration and requires careful planning to ensure that circuitry implemented on the FPGA to implement configuration functions is not overwritten by the bitstream until it is no longer required to support configuration. For example, the random number generator circuit can be loaded and used to produce a random number which is stored in the on-chip nonvolatile memory. After this number is stored it is safe to overwrite the area of the FPGA implementing the random number generator. Even the decryption circuitry can be implemented on the FPGA if a buffer memory is used so the decrypted bitstream information does not need to be immediately written into the device configuration memory. Most modern FPGAs contain RAM blocks for use in user designs—these memories could be used to buffer decrypted configuration information. The complexity of this technique means that it is presently not a preferred method of implementing the security circuitry.

Extension to Partially Configurable FPGAs

Although, for ease of explanation the configuration information is presented as a stream of ordered data which configures the entire FPGA control memory this is not the only possibility. FPGAs have been developed, such as the Xilinx XC6200, in which the control memory is addressable like a conventional SRAM. The configuring circuitry presents both address and data information in order to configure the chip and it is possible to configure sections of the device without interfering with the configuration or operation of other areas.

An FPGA which supports partial reconfiguration may be programmed by a sequence of bitstream fragments, each of which configures a particular area of the device. With dynamic reconfiguration some areas of the device may be configured more than once. From the point of view of this invention each bitstream fragment can be loaded and verified independently and would have its own cryptographic checksum. The semantics of the configuration data (for example whether it is a sequence of address, data pairs or a code which identifies a particular area of the device followed by a stream of data) does not make any difference to the security circuitry.

When a user design consists of multiple bitstream fragments the FPGA must not create a new cryptographic key for each segment. However, each encrypted bitstream segment will have a different Initial Value (IV) applied so this does not compromise security.

Application to Secure Bitstream Download

Many companies are becoming increasingly interested in methods for downloading FPGA bitstreams to a product after shipment to the end user. This allows a company to correct bugs in the design captured in the bitstream shipped with the product or to upgrade the product to a higher specification. This technique is particularly applicable to FPGAs which are installed in equipment connected to the internet or the telephone system.

There are obvious security concerns with this technique—a malicious party or a simple error could result in an incorrect bitstream being downloaded. An incorrect bitstream could potentially damage the product or render it inoperative. The incorrect bitstream might be downloaded to a very large number of systems in the field before a problem became apparent. Thus, it is desirable to implement a cryptographic protocol to secure downloads of bitstream information. An attractive method of implementing this protection is to use a symmetric cipher in cipher block chaining mode. However, in this application the secret key installed in the equipment must be shared with computer software at the equipment manufacturer's facility in order that the manufacturer can encrypt the bitstream prior to transmission over the public network.

It is desirable that the secret key for securing bitstream download stored in the equipment is protected from unauthorized access. One way of doing this is to store it on the FPGA chip in an ID register. This is quite practical but it is not necessary if the FPGA is implemented according to this invention because the off-chip nonvolatile memory is already cryptographically secured. Thus the key for downloading bitstreams can be safely stored with the rest of the FPGA configuration information. This has the advantage that the FPGA is not limited to a particular cryptographic algorithm or key length for secure bitstream download. This is important because communications security protocols on the internet and telecommunications industry are in a continuous state of flux and are not under the control of any particular manufacturer. FPGA customers are likely to wish to use a variety of download security protocols according to the requirements of the particular system they are designing.

Figure 8:
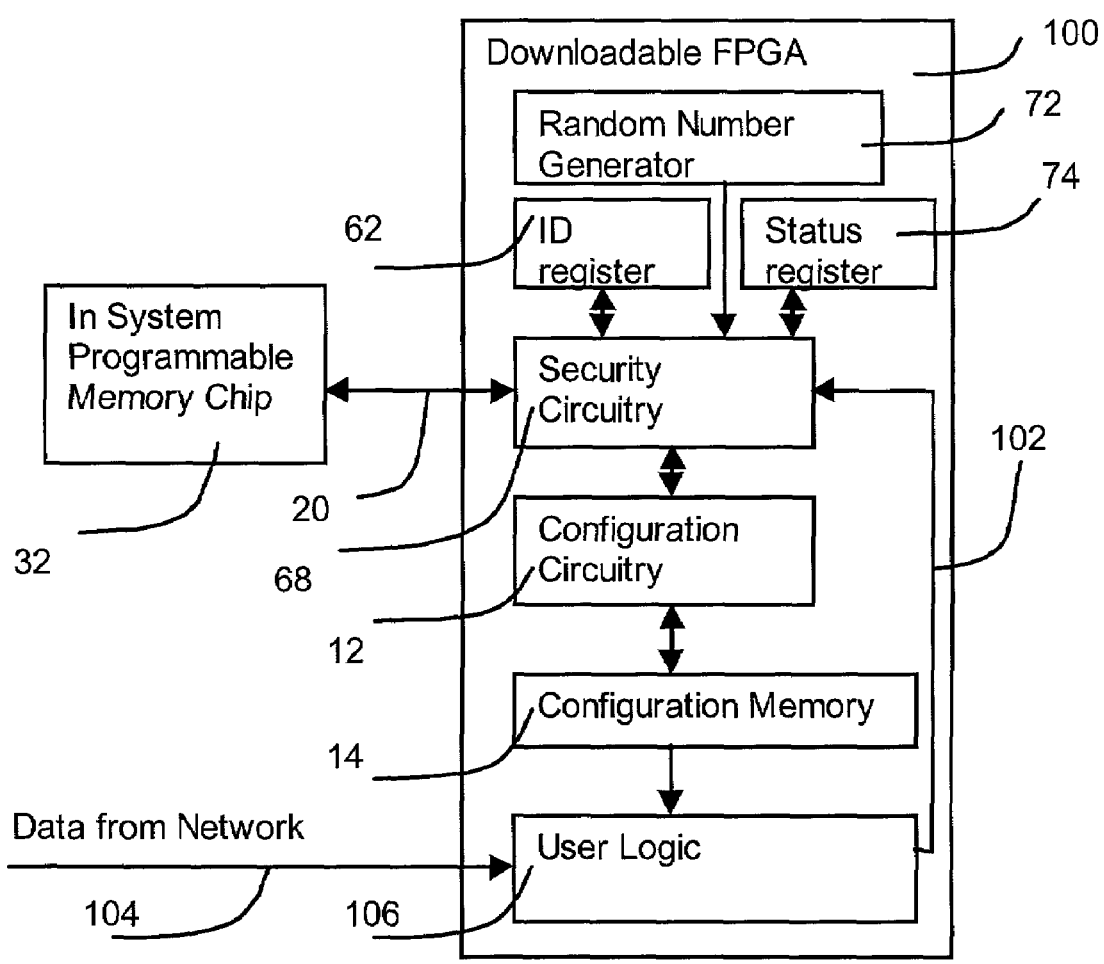
FIG. 8 shows a secure FPGA which can download configuration data from a communications network.

FIG. 8 shows an FPGA 100 according to this invention which supports secure download of bitstream information. Random number generator 72, ID register 62, status register 74, configuration circuitry 12, and configuration memory 14 have the same function as in the description of FIG. 5 above. User logic 106 is shown in this diagram but has been omitted from earlier figures: in this case a portion of the user logic is used to implement the download security algorithm. Data 104 from a communications network is supplied to the user logic through conventional user input/output pins on the FPGA. On-chip connection 102 between the security circuitry and the user logic is provided to transfer downloaded program data to the security circuitry after decryption by the user logic. The security circuitry will then encrypt this data using the key in ID register 64 before storing it in external memory 32. Thus the plain-text programming data is never available off-chip where it could be monitored by a malicious party.

Configurable System on Chip (CSOC) integrated circuits are particularly suited for use in applications which involve secure download of programming information because their on-chip microcontroller is better suited to implementing the more complex cryptographic functions required by standardized security protocols like Secure Sockets Layer (SSL) than the programmable logic gates on an FPGA. The principle of using encryption to protect program and configuration information illustrated in FIG. 8 is equally applicable to a CSoC. On a CSoC a combination of microcontroller software and fixed function logic gates would be used to implement the units illustrated in FIG. 8. As well as a configuration memory for the user logic an on chip program and data memory for the microcontroller would be provided. Connection 102 might be implemented by using microcontroller instructions rather than a physical wire on the chip, however the important constraint that the unencrypted configuration data is never be transferred off chip would remain.

CONCLUSION

The reader will see that the security system of this invention allows an FPGA or microcontroller with a large on-chip memory to securely restore the state of that memory from an off-chip nonvolatile memory while maintaining the ease of use of a prior art FPGA or microcontroller.

While the description above contains many specific details, these should not be construed as limitations on the invention, but rather as an exemplification of one preferred embodiment thereof. Many other variations are possible.

Accordingly, the scope of the invention should be determined not by the embodiments illustrated but by the appended claims and their legal equivalents.

What is claimed is:

1. A method of operating an integrated circuit containing on-chip volatile program memory comprising: inputting a stream of data comprising unencrypted configuration data to the integrated circuit; encrypting the unencrypted configuration data using a security circuit contained within the integrated circuit and a security key stored in the integrated circuit; and outputting a stream of encrypted configuration data from the integrated circuit; wherein the configuration data is for configuring the intergrated circuit.

2. The method of claim 1 comprising: storing the security key in a device ID register of the integrated circuit.

3. The method of claim 2 wherein the power supply to the ID register is backed up using an external battery.

4. The method of claim 3 wherein the external battery is coupled to a first power supply terminal to the ID register, and a second power supply terminal for non-backed up circuits is not coupled to the external battery.

5. The method of claim 2 wherein the ID register is nonvolatile.

6. The method of claim 5 wherein the ID register comprises floating-gate transistors.

7. The method of claim 5 wherein the ID register comprises fuses.

8. The method of claim 5 wherein the ID register comprises antifuses.

9. The method of claim 5 wherein the device ID register is implemented using an error correcting code scheme.

10. The method of claim 5 wherein the ID register is programmed during manufacture of the integrated circuit.

11. The method of claim 10 wherein the ID register is programmed using a laser.

12. The method of claim 10 wherein the ID register is programmed using a high voltage high enough to substantially permanently configure a value into the ID register.

13. The method of claim 1 comprising: storing the stream of encrypted configuration data in a nonvolatile storage device.

14. The method of claim 13 wherein the nonvolatile storage device is a serial EPROM or serial EEPROM.

15. The method of claim 13 wherein the nonvolatile storage device is a Flash memory.

16. The method of claim 1 comprising: generating the security key using a random number generator circuit of the integrated circuit.

17. The method of claim 16 further comprising: storing the security key in a device ID register of the integrated circuit.

18. The method of claim 1 comprising: receiving the stream of encrypted configuration data using a microprocessor.

19. The method of claim 18 comprising: using the microprocessor, writing the encrypted configuration data into a nonvolatile storage device.

20. The method of claim 1 wherein the security key has a fixed value and further comprising: generating an initial value for the security circuit; and outputting the initial value from of the integrated circuit.

21. The method of claim 20 wherein the unencrypted configuration data is encrypted using the initial value.

22. The method of claim 20 wherein the initial value is generated using a random number generator.

23. The method of claim 1 wherein the security circuit encrypts the unencrypted configuration data using a triple data encryption standard in a cipher block chaining mode algorithm.

24. The method of claim 1 wherein the stream of data is input serially.

25. The method of claim 1 comprising: configuring the integrated circuit using the unencrypted configuration data.

26. The method of claim 13 comprising: inputting the stream of encrypted configuration data from the nonvolatile storage device to the integrated circuit; decrypting the encrypted configuration data using the security circuit of the integrated circuit and the security key; and configuring the integrated circuit with a decrypted version of the encrypted configuration data.

27. The method of claim 1 wherein the unencrypted configuration data has approximately the same number of bits as the encrypted configuration data.

28. The method of claim 1 wherein the stream of data is loaded using a JTAG interface of the integrated circuit.

29. The method of claim 1 wherein the stream of data is provided using a microprocessor.

30. A method of operating a integrated circuit comprising:
receiving first encrypted configuration data and a first security key from a network;
decrypting the first encrypted configuration data to obtain unencrypted configuration data using the first security key using user programmed circuitry contained within the integrated circuit; and encrypting the unencrypted configuration data using a second security key and a fixed security circuit contained within the integrated circuit to obtain second encrypted configuration data; wherein the configuration data is for configuring the integrated circuit.

31. The method of claim 30 further comprising: outputting the second encrypted configuration data from the integrated circuit.

32. The method of claim 31 further comprising: storing the second encrypted configuration data in a nonvolatile storage device.

33. The method of claim 32 wherein the nonvolatile storage device is a serial EPROM.

34. The method of claim 30 wherein the second security key is stored in an ID register of the integrated circuit.

35. The method of claim 30 wherein user programmed circuitry outputs the unencrypted configuration data to the security circuit using an on-chip interconnection.

36. The method of claim 30 further comprising: configuring the integrated circuit using the unencrypted configuration data.

37. The method of claim 30 wherein the first encrypted configuration data is serially transferred to an I/O pin of the integrated circuit.

38. The method of claim 30 wherein the security circuit encrypts the unencrypted configuration data using a triple data encryption standard (DES) in a cipher block chain (CBC) mode algorithm.

39. An integrated circuit field programmable gate array comprising: a serial interface for loading initial configuration and key information; a battery-backed on-chip memory for storing the cryptographic key; a triple-DES encryption circuit; and an interface to an external nonvolatile memory for storing encrypted configuration data.

40. A method for securely configuring an FPGA comprising: loading key information into an on-chip battery-backed register; loading an initial configuration through a JTAG interface; and storing an encrypted version of the configuration in an external nonvolatile memory.

41. The method of claim 40, wherein the on-chip register is connectable to an external backup battery.

42. The method of claim 41, further comprising encrypting the initial configuration using the key information.

43. An integrated circuit field programmable gate array comprising: a plurality of static random access memory cells to store a configuration of user-configurable logic of the field programmable gate array; an ID register to store a security key; and a decryption circuit to receive and decrypt a stream of encrypted configuration data using the security key, and generate decrypted configuration data for configuring the static random access memory cells.

44. The field programmable gate array of claim 43 further comprising: a first positive supply input pin coupled to the static random access memory cells, user-configurable logic, and decryption circuit; and a second positive supply input pin coupled to the ID register, wherein the second positive supply input is to be coupled to an external backup battery.

45. The field programmable gate array of claim 44 further comprising: a random number generator circuit to generate the security key.

46. The field programmable gate array of claim 44 wherein when power is removed from the first positive supply input pin, the configuration of the static random access memory cells is erased, and the security key stored in the ID register is maintained by the external backup battery.

47. The field programmable gate array of claim 46 wherein the external backup battery only supplies power to the ID register.

48. The field programmable gate array of claim 47 wherein a current draw on the external backup battery is about a microamp or less.

49. The field programmable gate array of claim 47 wherein current draw on the external backup battery is about 10 microamps or less.

50. The field programmable gate array of claim 43 wherein the decryption circuit decrypts the stream of encrypted configuration data using a triple-DES algorithm.

51. The field programmable gate array of claim 43 further comprising:
an interface for loading configuration data; and
an interface to an external nonvolatile memory, the memory for storing the configuration data;
and wherein the ID register comprises an on-chip memory connectable to an external backup battery.

52. The field programmable gate array of claim 43, further comprising an encryption circuit.

53. The field programmable gate array of claim 52, wherein the decrypted configuration data is encrypted by the encryption circuit before the configuration data is passed off of the field programmable gate array.

54. A field programmable gate array comprising:
an interface for loading configuration information for the field programmable gate array;
an on-chip memory for storing a cryptographic key, wherein the on-chip memory is connectable to an external backup battery;
a security circuit to receive the configuration information and determine using header information within the configuration information whether the configuration information is encrypted or unencrypted; and
an interface to an external nonvolatile memory, the memory for storing configuration data.

55. The field programmable gate array of claim 54, wherein the security circuit comprises an encryption circuit for encrypting the configuration information using the cryptographic key.

56. The field programmable gate array of claim 54, wherein the security circuit comprises a description circuit for decrypting the configuration information using the cryptographic key, if the configuration is determined to be encrypted.

57. A method for securely configuration an FPGA comprising:
loading key information into an on-chip register, wherein the on-chip register is connectable to an external backup battery;
loading a configuration for the FPGA through an interface;
determining using header information within the configuration whether the configuration is encrypted or unencrypted;
processing the configuration using the key information; and
using th configuration information to configure the FPGA.

58. The method of claim 57, wherein processing the configuration comprises decrypting the configuration if the configuration is determined to be encrypted.

59. The method of claim 57, wherein processing the configuration comprises encrypting the configuration if the configuration is determined to be unencrypted.

60. A field programmable gate array comprising:
a plurality of volatile memory cells to store a configuration of user-configurable logic of the field programmable gate array;
an ID register to store a security key;
a security circuit to receive a stream of configuration data for the field programmable gate array and determine using header information within the stream whether the stream is encrypted or unencrypted, and if the stream is encrypted to decrypt the stream using the security key, to generate decrypted configuration data for configuring the volatile memory cells;
a first positive supply input pin connected to the volatile memory cells, user-configurable logic, and security circuit; and
a second positive supply input pin connected to the ID register, wherein the second positive supply input is connectable to an external backup battery.

61. The field programmable logic array of claim 60, wherein when power is removed from the first positive supply input pin, the configuration of the volatile memory cells is erased, and the security key stored in the ID register is maintained by the external backup battery.

62. The field programmable gate array of claim 61, wherein the external backup battery only supplies power to the ID register.

63. The field programmable gate array of claim 62, wherein a current draw on the external backup battery is about a microamp or less.

64. The field programmable gate array of claim 62, wherein a current draw on the external backup battery is about 10 microamps or less.

65. The field programmable gate array of claim 60, wherein the security circuit decrypts the stream of encrypted configuration data using a triple-DES algorithm.

66. The field programmable gate array of claim 60 further comprising;
a random number generator circuit to generate the security key.

67. A circuit comprising:
a field programmable gate array, comprising:
a plurality of volatile memory cells to store a configuration of user-configurable logic of the field programmable gate array;
an ID register to store a security key;
a security circuit to receive a stream of configuration data for the field programmable gate array and determine using header information within the stream whether the stream is encrypted or unencrypted, and if the stream is encrypted to decrypt the stream using the security key, to generate decrypted configuration data for configuring the volatile memory cells;
a first positive supply input pin connected to the volatile memory cells, user-configurable logic, security circuit; and
a second positive supply input pin connected to the ID register;
a power supply connected to the second positive supply input pin, to provide operating power to the volatile memory cells, user-configuration logic, and security circuit; and
a battery connected to the second positive supply input pin, to power to the ID register.

68. The circuit of claim 67, wherein the battery provides backup power to the ID register, to maintain the security key stored in the ID register when the power supply is not active.

69. The circuit of claim 67, wherein when the power supply is not active, the configuration of the volatile memory cells is erased, and the security key is maintained by the battery.

70. The circuit of claim 69, wherein the battery supplies power only to the ID register.

71. A method for securely configuring an FPGA using a bitstream, comprising:
loading header information contained in the bitstream into the FPGA;
determining, based on the header information, a security processing operation to apply to the bitstream;
loading configuration information contained in the bitstream into the FPGA;
applying the security processing operation to the configuration information being loaded into the FPGA; and
using the configuration information to configure the FPGA.

72. The method of claim 71, wherein the header information indicates that the configuration data is unencrypted.

73. The method of claim 72, wherein the header information indicates that no security processing operation is to be applied.

74. The method of claim 72, wherein the header information indicates that the security processing operation is to encrypt the unencrypted configuration information using a randomly-generated key and load the encrypted configuration information into an external non-volatile memory.

75. The method of claim 72, wherein the header information indicates that the security processing operation is to encrypt the unencrypted configuration information using a key installed in the FPGA and load the encrypted configuration information into an external non-volatile memory.

76. The method of claim 72, wherein the header information indicates that the security processing operation is to encrypt the unencrypted configuration information using a key included in the header information and load the encrypted configuration information into an external non-volatile memory.

77. The method of claim 71, wherein the header information indicates that the configuration information is encrypted, and the security processing operation is to unencrypt the encrypted configuration data and load the unencrypted configuration information into configuration memory.

78. The method of claim 71, wherein the bitstream comprises a preamble portion.

79. The method of claim 78, wherein information in the preamble indicates whether the configuration information in the bistream is encrypted or unencrypted.

80. The method of claim 78, wherein based on the preamble, the integrated circuit determines whether the bitstream is for a previous version of the FPGA, without a security scheme, or the bistream is for a version of the FPGA with the security scheme.

81. The method of claim 78, wherein when using the preamble, an FPGA with a security scheme will be backwards compatible with versions of the FPGA without the security scheme.

82. The method of claim 78, further comprising: when the preamble is a first value, processing the bitstream as a stream of data for a version of the FPGA without a security scheme; and when the preamble is a second value, different from the first value, processing the bitstream as a stream of configuration information for a version of the FPGA with the security scheme.

83. The method of claim 71, wherein the bitstream further comprises header, initial value, configuration data, and message authentication code portions.

84. A field programmable gate array, comprising:
a plurality of volatile memory cells to store a configuration of user configurable logic of the field programmable gate array;
a desryption circuit to receive and decrypt a stream of encrypted a stream of configuration data using a security key, and generate decrypted configuration data for configuring the user configurable logic;
a non-volatile register to store the security key, wherein a length of the security key comprises n bits and the register comprises m bits, wherein m equals n plus k additional bits, said non-volatile register being built from unreliable memory cells;
an error-correcting code circuit which uses one or more of the k additional bits in the non-volatile register to calculate a correct value of the security key even if one or more of the m bits do not operate correctly;

wherein the u reliable memory cells are fabricated using memory cell technology compatible with standard CMOS processing, said memory cells being unreliable due to the use of standard CMOS processing.

85. The field programmable gate array of claim 84, wherein the unreliable memory cells comprise memory cells constructed using a conventional CMOS processing flow.

86. The field programmable gate array of claim 85, wherein the unreliable memory cells comprise floating gate transistors.

87. The field programmable gate array of claim 84, wherein the register is connectable to a backup battery.

88. The field programmable gate array of claim 84, wherein the register is a non-volatile memory.

89. A field programmable gate array comprising:
   user configuration logic;
   a plurality of volatile memory cells to store a configuration of user configurable logic of the field programmable gate array;
   a register to store a security key;
   a decryption circuit to receive and decrypt a plurality of streams of encrypted configuration data using the security key, and generate decrypted configuration data for configuring the user configurable logic;
wherein each of the plurality of streams of configuration data cause an area of the field programmable gate array to be configured.

90. The field programmable gate array of claim 89, wherein a subsequent one of the plurality of streams of configuration data may re-configure an area of the field programmable gate array which was previously configured by an earlier one of the plurality of streams of configuration data.

91. The field programmable gate array of claim 89, wherein a single security key is used with a different initial value for each of the plurality of streams of configuration data.

92. The field programmable gate array of claim 89, wherein each of the plurality of streams of configuration data can be loaded independently and verified independently of the plurality of streams of configuration data.

93. The field programmable gate array of claim 89, wherein the register comprises a non-volatile memory connectable to an external backup battery.

94. A field programmable gate array, comprising:
   a plurality of volatile memory cells to store a configuration of user configurable logic of the field programmable array;
   a decryption circuit to receive and decrypt a stream of encrypted configuration data using a security key, and generate decrypted configuration data for configuring the user configurable logic;
   a non-volatile register to store the security key;
   a lock down control bit programmable to prevent the security key from being changed once the stream of configuration data is loaded.

95. The field programmable gate array of claim 94, wherein the lock down control bit allows the security key to be changed if the FPGA is supplied with a key change request that includes the security key.

* * * * *